(12) United States Patent
Verduijn et al.

(10) Patent No.: US 6,974,889 B1
(45) Date of Patent: Dec. 13, 2005

(54) PROCESSES FOR MANUFACTURE OF MOLECULAR SIEVES

(75) Inventors: Johannes Petrus Verduijn, deceased, late of Oostvoorne (NL); by Jannetje Maatje van den Berge, legal representative, Oostvoorne (NL); Machteld Maria Wilfried Mertens, Boortmeerbeek (BE); Wilfried Jozef Mortier, Kessel-Lo (BE); Marcel Johannes Janssen, Kessel-Lo (BE); Cornelius Maria Wilhelmus Van Oorschot, Brasschaat (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/744,697

(22) PCT Filed: Jul. 28, 1999

(86) PCT No.: PCT/GB99/02480

§ 371 (c)(1),
(2), (4) Date: Aug. 10, 2001

(87) PCT Pub. No.: WO00/06493

PCT Pub. Date: Feb. 10, 2000

(30) Foreign Application Priority Data

Jul. 29, 1998 (GB) .................... 9816505
Jul. 29, 1998 (GB) .................... 9816508

(51) Int. Cl.[7] .................... C01B 25/26; C01B 33/26; B01J 27/16; B01J 27/182; C07C 1/207
(52) U.S. Cl. .................... 585/528; 95/143; 423/305; 423/328.2; 502/208; 502/214; 585/640; 585/820
(58) Field of Search .................... 423/305, 328.1, 423/328.2; 95/143; 585/640, 820, 528; 502/208, 502/214

(56) References Cited

U.S. PATENT DOCUMENTS

| | | | | | |
|---|---|---|---|---|---|
| 4,440,871 A | * | 4/1984 | Lok et al. | .................... | 423/305 |
| 4,814,316 A | * | 3/1989 | Pellet et al. | .................... | 423/305 |
| 5,370,851 A | * | 12/1994 | Wilson | .................... | 423/305 |
| 5,912,393 A | * | 6/1999 | Barger et al. | .................... | 423/305 |
| 6,150,293 A | * | 11/2000 | Verduijn et al. | .................... | 502/67 |
| 6,334,994 B1 | * | 1/2002 | Wendelbo et al. | .................... | 423/305 |

FOREIGN PATENT DOCUMENTS

| | | |
|---|---|---|
| EP | 110650 A1 | 6/1984 |
| EP | 753484 A1 | 1/1997 |
| EP | 753485 A1 | 1/1997 |
| WO | WO9521792 | 8/1995 |

* cited by examiner

Primary Examiner—Wayne A. Langel

(57) ABSTRACT

Colloidal crystalline molecular sieve seeds are used in phosphorus-containing crystalline molecular sieve manufacture. Certain of the products have enhanced utility in oxygenate conversions.

23 Claims, 1 Drawing Sheet

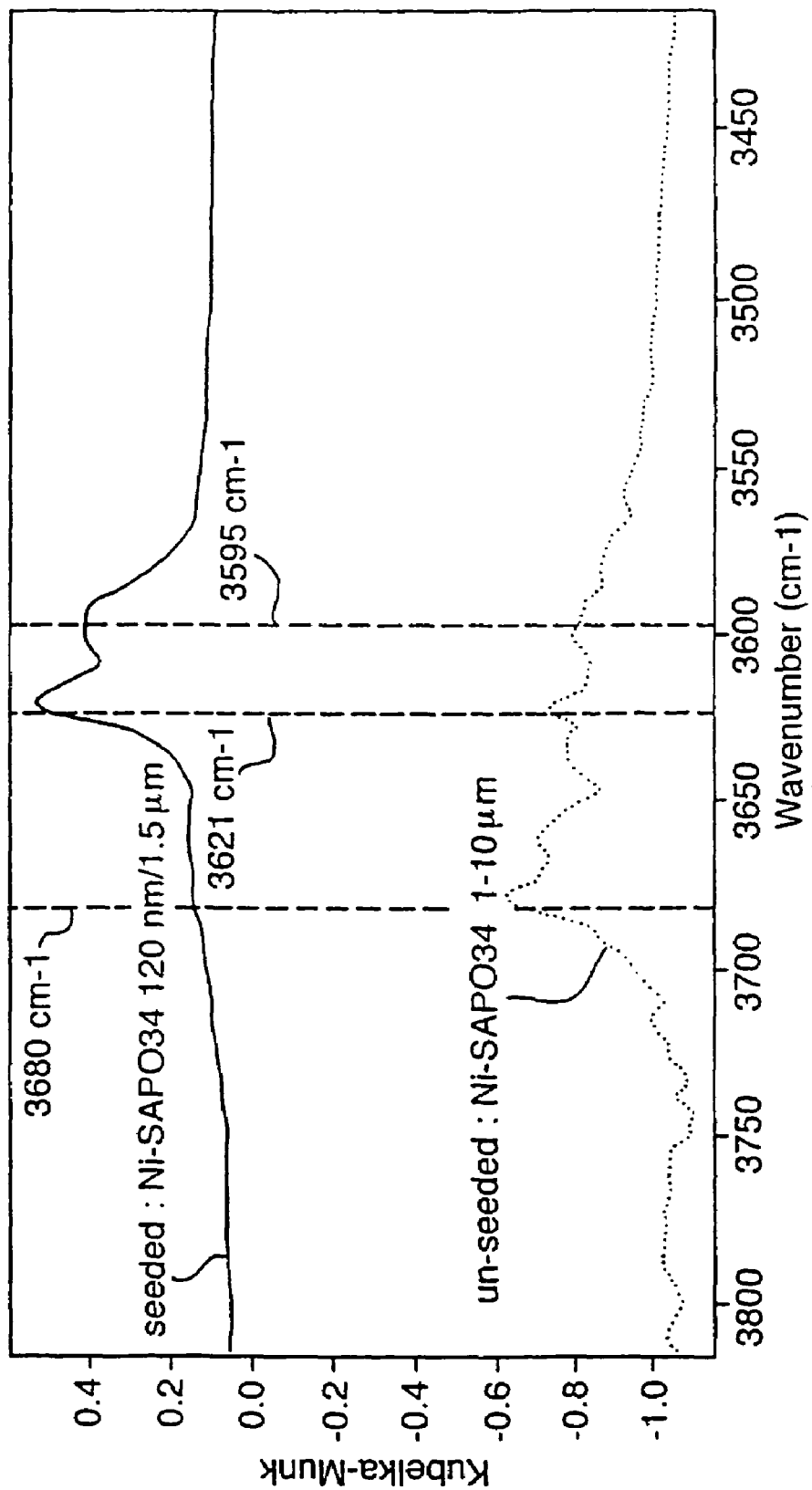

PROCESSES FOR MANUFACTURE OF MOLECULAR SIEVES

This invention relates to molecular sieves and processes for their manufacture. More especially it relates to processes in which synthesis mixtures are seeded to control process conditions and product characteristics. The invention relates primarily to the manufacture of phosphorus-containing molecular sieves.

It is well-known that seeding a molecular sieve synthesis mixture frequently has beneficial effects, for example in controlling the particle size of the product, avoiding the need for an organic template, accelerating synthesis, and improving the proportion of product that is of the intended structure type.

In U.S. Pat. No. 4,440,871, the preparation of a number of phosphorus-containing molecular sieves is described, and it is stated that the crystallization procedure may be facilitated by stirring, or other moderate agitation of the synthesis mixture, or by seeding it with crystals of the molecular sieve to be produced or one of a topologically similar structure.

The patent particularly describes processes for the manufacture of numerous crystalline microporous silicoaluminophosphates (SAPO's) including SAPO-34, employing sources of silicon (e.g., a silica sol), aluminium (e.g., hydrated aluminium oxide), and phosphorus (e.g., orthophosphoric acid), and an organic template, for example tetraethylammonium hydroxide (TEAOH), isopropylamine (iPrNH$_2$) or di-n-propylamine (DPA). The patent, the disclosure of which is incorporated by reference herein, gives X-ray diffraction data for the SAPO's and describes their utilities in catalysis and absorption.

It has now been found that advantages result from the use of colloidal seeds in the manufacture of phosphorus-containing molecular sieves.

The present invention accordingly provides in a first aspect a process for the manufacture of a crystalline molecular sieve containing phosphorus in its framework, which process comprises treating a synthesis mixture comprising elements necessary to form the phosphorus-containing molecular sieve and colloidal crystalline molecular sieve seeds for a time and at a temperature appropriate to form the desired molecular sieve.

It has surprisingly also been found that the seed crystals may be of a structure type different from that of the desired molecular sieve. Such seeding may be regarded as "heterostructural", whereas seeding with seeds of the same structure type is termed "isostructural", whether or not the seeds are of the same composition (i.e., contain the same elements in the same proportions) as the crystalline molecular sieve to be produced.

Where the seeds are of a structure type different from those of the desired molecular sieve, advantageously the seeds and the desired molecular sieves are topologically similar, for example are members of the ABC-6 group of materials, as described in "Topochemistry of Zeolites and Related Materials", J. V. Smith, Chem. Rev. 1988, 88, 149 at 167, the disclosure of which review article is incorporated herein by reference. The ABC-6 group includes, inter alia, the Offretite, Chabazite and Levyne structures.

As used in this specification, the term "structure type" is used in the sense described in the Structure Type Atlas, Zeolites 17, 1996.

The present invention accordingly provides in a second aspect a process for the manufacture of a crystalline molecular sieve containing phosphorus in its framework, which comprises treating a synthesis mixture comprising elements necessary to form a phosphorus-containing molecular sieve of a first structure type and colloidal molecular sieve seed crystals of a second, different, structure type, for a time sufficient and at a temperature appropriate to form the molecular sieve of the first structure type.

In further aspects, the invention provides the use, in the synthesis of a phosphorus-containing crystalline molecular sieve, of colloidal seed crystals to control the particle size of the product, or to accelerate the formation of the product, or both to control the particle size and accelerate the formation of the product.

As the phosphorus-containing molecular sieves to be prepared by the processes of the invention, there may be mentioned more especially aluminophosphates and silicoaluminophosphates. As examples of structure types produced there may be mentioned more especially molecular sieves of the structure types CHA and LEV. As seeds, there may for example be used crystals of structure type LEV, OFF, and CHA. As specific materials to be used, there may be mentioned Levyne, ZSM-45, Chabasite, Offretite and SAPO-34.

The seeds used in the present invention may be obtained by methods described herein or known in the art or described in the literature.

Manufacture of OFF-structure type seed crystals, in particular colloidal Offretite seeds, may be carried out as described in International Application No. WO 97/03020, while suitable procedures, including details of synthesis mixtures and hydrothermal treatment, for the manufacture of LEV- and CHA-structure type crystals are described in EP-A-91048, 91049, 107 370, 143 642 and U.S. Pat. No. 4,495,303 (for LEV) and GB-A-868 846 and 2 061 500 and U.S. Pat. Nos. 3,030,181 and 4,544,538 (for CHA), the disclosures of all of which are incorporated by reference herein. Manufacture of CHA- and LEV-structure type seed crystals is advantageously carried out as described in the examples below.

Apart from the presence of the seeds, the synthesis mixture used in the present invention is typically one that is known in the art or as described in the literature as suitable for the production of the molecular sieve concerned. This is also the case for the conditions of treatment, except that the presence of the seeds may make possible the reduction of reaction times or may obviate stirring if that were otherwise necessary.

In general, the treatment of the synthesis mixture to yield the desired phosphorus-containing crystalline molecular sieve, usually termed hydrothermal treatment, though strictly that term should be used only for treatments in which there is vapour-phase water present, is advantageously carried out under autogenous pressure, for example in an autoclave, for example a stainless steel autoclave which may, if desired, be ptfe-lined. The treatment may, for example, be carried out at a temperature within the range of from 50, advantageously from 90, especially 120, to 250° C., depending on the molecular sieve being made. The treatment may, for example, be carried out for a period within the range of from 20 to 200 hours, preferably up to 100 hours, again depending on the molecular sieve being formed. The procedure may include an ageing period, either at room temperature or, preferably, at a moderately elevated temperature, before the hydrothermal treatment at more elevated temperature. The latter may include a period of gradual or stepwise variation in temperature.

For certain applications, the treatment is carried out with stirring or with rotating the vessel about a horizontal axis (tumbling). For other applications, static hydrothermal treatment is preferred. If desired, the synthesis mixture may be stirred or tumbled during an initial part of the heating stage, for example, from room temperature to an elevated, e.g., the final treatment, temperature, and be static for the remainder. Agitation generally produces a product with a smaller particle size and a narrower particle size distribution than static hydrothermal treatment.

The seeds are generally present in the synthesis mixture in a concentration of up to 10000, advantageously at most 3000, more advantageously at most 1500, and preferably at most 1000, more preferably at most 500, and most preferably at most 350 ppm, based on the total weight of the synthesis mixture. A minimum seeding level is generally 1 ppb (0.001 ppm), advantageously at least 0.1, more advantageously at least 1, and preferably at least 10, ppm, based on the total weight of the synthesis mixture. Advantageous ranges of proportions are from 1 to 2000, preferably 100 to 1500, and most preferably 100 to 250, ppm.

The colloidal seeds are advantageously incorporated in the synthesis mixture in the form of a suspension, advantageously in an aqueous medium, preferably water, or another liquid component of the synthesis mixture. Less preferably they may be added in dry, but not calcined, form. It is believed that calcination significantly reduces the activity of small crystallites to act as seeds; similarly any other treatment that reduces the seeding activity of materials should be avoided. As used herein, the term "colloidal", when used of a suspension, refers to one containing discrete finely divided particles dispersed in a continuous liquid phase and preferably refers to a suspension that is stable, in the sense that no visible separation occurs or sediment forms, in a period sufficient for the use intended, advantageously for at least 10, more advantageously at least 20, preferably at least 100, and more preferably at least 500, hours at ambient temperature (23° C.).

The maximum size of the particles for the suspension to remain stable (peptized) will depend to some extent on their shape, on the nature and pH of the continuous medium, as well as on the period during which the suspension must remain usable. In general, the maximum dimension will be 1 $\mu$m, advantageously 500, more advantageously 400, preferably 300, more preferably 200, and most preferably 100, nm. The particles may be of spherical, columnar, rod, coffin, platelet, or needle shapes. Where particles are platelets or needles, the dimension referred to is their smallest dimension.

The minimum dimension is such that the particles do not dissolve or re-dissolve in the medium, and for crystallinity they must contain at least a small plurality, advantageously at least two, preferably four, unit cells of the crystal. The minimum particle size is in general 5, advantageously 10, and preferably 20, nm. Mean particle sizes are generally in the range 5 to 1000, advantageously 10 to 300, more advantageously 10 to 200, and preferably 20 to 100, nm. Advantageously at least 50%, more advantageously at least 80%, and more preferably at least 95%, by number, of the particles are greater than the given minima, smaller than the given maxima, or within the given ranges of particle size. Measurements of particle size may be effected by electron microscopy, for example using a Philips SEM 515 unit.

If the product is desired in small particle size form, a larger number of smaller sized seeds is desirably employed. The smaller the particle size of the seeds, the lower the weight percentage that is effective. The crystals are advantageously stirred into the synthesis mixture for a time sufficient to provide a uniform dispersion, this time being dependent primarily on the viscosity of the synthesis mixture, and also on the scale and type of the equipment, but ranging generally from 30 seconds to 10 minutes.

More especially, the invention provides processes and uses in which colloidal LEV structure type seeds are used in the manufacture of a phosphorus-containing crystalline molecular sieve.

A colloidal suspension of LEV may be obtained by synthesizing a LEV structure type molecular sieve by hydrothermal treatment of an appropriate synthesis mixture, and separating the product from the synthesis mixture, washing the product, and recovering the resulting wash liquid.

Examples of the LEV structure type include Levyne, NU-3, ZK-20, ZSM-45 and SAPO-35.

The colloidal LEV seeds are especially suitable to provide crystalline molecular sieves of the CHA structure type. Examples of such CHA materials are SAPO-, AlPO-, MeAPO-, MeAPSO-, ElAPSO- and ElAPO-47 and especially the corresponding-34 materials. In these formulae, El represents magnesium, zinc, iron, cobalt, nickel, manganese, chromium or mixtures of any two or more such elements. CHA structure type seeds may also be used in synthesis of these materials. LEV and CHA structure type seeds may be used in the synthesis of SAPO-, AlPO-, MeAPO-, MeAPSO-, ElAPSO- and ElAPO-materials of the LEV structure type, e.g., the -35 materials. Where a material is referred to as, for example, a SAPO material, this terminology includes the possibility that additional elements may be present, either in the framework or otherwise, as in the case discussed below, of Ni-SAPO.

Among these materials, SAPO-34 has been found to have considerable utility in catalysing the conversion of methanol to light olefins, primarily those with 2 to 4 carbon atoms (see, for example, U.S. Pat. No. 5,126,308, also incorporated by reference herein). It would be of value to be able to increase the proportion of ethylene in the product.

The present invention accordingly also provides a process for the manufacture of SAPO-34 in which the percentage area contribution of Broensted acid sites to the total OH area in the IR spectrum is at least 30%, advantageously at least 50%, and preferably at least 60%, by a procedure in which the synthesis mixture contains colloidal crystalline molecular sieve crystals. In certain embodiments, percentage area contribution is at most 95%.

More especially, the invention further provides a process for the manufacture of SAPO-34, which comprises treating a synthesis mixture having a molar composition appropriate for SAPO-34 formation and also containing colloidal OFF-type, CHA-type, or LEV-type seed crystals, advantageously of mean particle size of at most 400 nm, for a time and at a temperature sufficient to form SAPO-34.

The process of the invention is capable of providing SAPO-34 in which the particle size is at most 0.75 $\mu$m, advantageously at most 0.5 $\mu$m. Advantageously the particle size distribution is such that 80% (by number) of the particles are within ±10% of the mean.

In a further aspect, the invention provides a process for the conversion of an oxygenate, especially methanol, to olefins which comprises contacting the oxygenate with a catalyst under conversion conditions, the catalyst comprising SAPO-34 produced in accordance with the invention.

The olefins produced are advantageously light olefins, by which is to be understood an olefin mixture of which at least 50% by weight contain from 2 to 4 carbon atoms.

Referring now more especially to the Broensted acid site aspect of the invention, it is believed (without the invention being limited by any theoretical considerations) that the Broensted acidity is important in the catalytic activity, especially in oxygenate to olefin conversion, of a molecular sieve, and that a molecular sieve in which the bridged hydroxyl groups represent a high proportion of the hydroxyl groups in the crystal will have a high activity. Infra-red analysis of a highly active product of the invention (described as are the methods of measurement in more detail in the Examples below) shows that in the SAPO-34 OH region, 4000 to 3000 cm$^{-1}$, two peaks, at ~3620 and ~3595 cm$^{-1}$, are the main features, while less active samples show a number of bands in the range from 3750 to 3620 cm$^{-1}$, which are assigned to Al—OH, Si—OH, and P—OH groups on an external surface or on an internal defect.

A further IR spectrum characteristic associated with catalytic activity is a high peak intensity in the T-O asymmetric stretch region, at 1050 to 1150 cm$^{-1}$, intensity being indicated by both height and sharpness, i.e., a high level of internal crystallinity. It is accordingly believed that a correlation exists between high internal crystallinity, or crystal perfection, and a high contribution of Broensted OH groups to the total OH content of the material.

Further, in common with many other molecular sieves, the catalytic activity and stability of activity of SAPO-34 are in general terms greater the smaller the particle size.

The synthesis mixture for producing SAPO-34 according to the invention advantageously has a molar composition, apart from the colloidal seeds, within the following ranges:

| | |
|---|---|
| $P_2O_5:Al_2O_3$ | 0.9 to 1.2:1 |
| $SiO_2:Al_2O_3$ | 0.05 to 0.4:1 |
| $H_2O:Al_2O_3$ | 10 to 100:1 | together with an organic template, advantageously tetraethylammonium hydroxide (TEAOH), dipropylamine (DPA), isopropylamine or morpholine, or a mixture of two or more such templates, in a proportion appropriate to yield SAPO-34. A preferred template mixture comprises TEAOH and DPA.

In a particularly advantageous embodiment of the invention the synthesis mixture advantageously contains a source of metallic elements, especially a Group VIII metal, more especially nickel. A convenient source of the metal is a water-soluble salt, for example the nitrate. The metal is advantageously present in a molar proportion calculated as oxide relative to $Al_2O_3$ within the range of 0.001 to 0.05, preferably 0.005 to 0.01. The presence of nickel enhances the catalytic activity at least in oxygenate conversion. Other suitable Group VIII metals include Fe and Co, while other suitable metals include Mn, Cr, Cu, Zn, Mg, Ti and Zr.

The sources of the materials may be any of those in commercial use or described in the literature, as may the preparation of the synthesis mixture.

The invention also provides the products of the processes and of the uses of the earlier aspects of the invention. The products, if required after cation exchange and/or calcining, have utility as catalyst precursors, catalysts, and separation and absorption media. They are especially useful in numerous hydrocarbon conversions, separations and absorptions. They may be used alone, or in admixture with other molecular sieves, in particulate form, supported or unsupported, or in the form of a supported layer, for example in the form of a membrane, for example as described in International Application WO 94/25151. Hydrocarbon conversions include, for example, cracking, reforming, hydrofining, aromatization, oligomerisation, isomerization, dewaxing, and hydrocracking (e.g., naphtha to light olefins, higher to lower molecular weight hydrocarbons, alkylation, transalkylation, disproportionation or isomerization of aromatics). Other conversions include the reaction of alcohols with olefins and the conversion of oxygenates to hydrocarbons.

Conversion of oxygenates may be carried out with the oxygenate, e.g., methanol, in the liquid or, preferably, the vapour phase, in batch or, preferably, continuous mode. When carried out in continuous mode, a weight hourly space velocity (WHSV) based on oxygenate, of advantageously 1 to 1000, preferably 1 to 100, hour$^{-1}$ may conveniently be used. An elevated temperature is generally required to obtain economic conversion rates, e.g., one between 300 and 600° C., preferably from 400 to 500° C., and more preferably about 450° C. The catalyst may be in a fixed bed, or a dynamic, e.g., fluidized or moving, bed.

The oxygenate feedstock may be mixed with a diluent, inert under the reaction conditions, e.g., argon, nitrogen, carbon dioxide, hydrogen, or steam.

The concentration of methanol in the feedstream may vary widely, e.g., from 5 to 90 mole percent of the feedstock. The pressure may vary within a wide range, e.g., from atmospheric to 500 kPa.

The following Examples, in which parts are by weight unless otherwise indicated, illustrate the invention. The source and purity of starting materials are those first given, unless indicated otherwise.

EXAMPLE 1

This example illustrates the manufacture of a LEV-type zeolite of particle size suitable for use as seeds in the manufacture, inter alia, of phosphorus-containing crystalline molecular sieves.

In a first stage, 15.95 parts of sodium aluminate (Dynamit Nobel, 53% $Al_2O_3$, 41% $Na_2O$, 6% $H_2O$), 19.95 parts of sodium hydroxide (Baker, 98.6%) and 5.58 parts of potassium hydroxide (Baker, 87.4%) were dissolved in 151.06 parts of water, and heated to boiling until a clear solution was obtained. After cooling to room temperature, water loss was compensated, to form Solution A. 270.60 parts of colloidal silica (Ludox HS40, 40% $SiO_2$) were mixed with 106.12 parts of choline chloride (R, Fluka) forming a viscous mass, and Solution A added with stirring at increasing speed as the viscosity decreased, together with 190 parts of rinse water, mixing then continuing for a further 5 minutes. The molar composition was:

1.95 $Na_2O$:0.24 $K_2O$:0.46 $Al_2O_3$:10 $SiO_2$:4.187 R:155 $H_2O$.

To 290 parts of this mixture, 0.49 parts of conventional LEV zeolite seeds were added, and a sample transferred to an autoclave, where it was heated in a 120° C. oven for 144 hours. The product was washed, recovered by centrifuging and dried overnight at 120° C. The product comprised spherical aggregates of from 2 to 2.5 μm, made up of ~100 nm particles, with an X-ray diffraction pattern (XRD) of ZSM-45, a zeolite of LEV-type structure, as described in EP-A-1O7 370 (Mobil).

The product was used as seeds in the next stage, in which 8.38 parts of sodium aluminate, 10.53 parts of sodium hydroxide, 2.96 parts of potassium hydroxide, and 78.95 parts of water were treated as described above to form a Solution A. Solution A was then added to a mixture of 142.42 parts of colloidal silica and 55.5 parts of choline chloride, together with 100.00 parts of rinse water and mixed as described above, with the addition of 0.68 parts of the first stage seeds. The reaction mixture was heated in an autoclave at 120° C. for 174 hours, the product recovered by washing, centrifuging and drying having an XRD similar to that of the first stage. The second supernatant of the washing procedure was not clear, and had a pH of 10.3. It was found to be a dispersion with a solids content of 2.3%. Analysis by scanning electron microscopy (SEM) and XRD showed ~100 nm unaggregated crystals with a ZSM-45 structure, LEV structure type.

EXAMPLE 2

This example illustrates the manufacture of a chabasite dispersion suitable for use, in turn, for seeding in SAPO-34 manufacture. The seeds were prepared as follows:

A synthesis mixture was prepared as described in the first part of Example 1, except that as seeds the colloidal sol from the second supernatant of the second part of Example 1 was used, at a seeding level of 0.15% by weight of solids. The seeded synthesis mixture was heated in a stainless steel autoclave for 96 hours at 120° C., with a heat-up time of 3 hours. The product, recovered by centrifuging and drying, had an XRD pattern corresponding to ZSM-45. The first supernatant was not clear and yielded, after centrifuging at 11000 rpm and further washing, a dispersion with solids content 4.6%, of crystals of size about 100 nm, XRD showing the product to be ZSM-45, a LEV structure-type zeolite.

Solution A was prepared as described in Example 1 using the following components, in the proportions shown:

| | |
|---|---|
| NaOH | 61.66 |
| KOH | 28.73 |
| Al(OH)$_3$(Alcoa, 99.3%) | 15.73 |
| H$_2$O | 190.30 |

300.23 parts of colloidal silica and 168.89 parts of water were poured into a mixer, and Solution A added together with 12.65 parts of rinse water. After mixing for 5 minutes, 16 parts of the 4.6% solids LEV slurry were added. The molar composition of the synthesis mixture was:

3.8 Na$_2$O:1.12 K$_2$O:0.5 Al$_2$O$_3$:10 SiO$_2$:161 H$_2$O, with 927 ppm seeds.

The synthesis mixture was heated in an autoclave to 100° C. over 2 hours, and maintained at that temperature for 96 hours. After cooling, the content of the autoclave, a milky suspension, was washed five times with demineralized water and centrifuged at 9000 rpm. After taking a sample for XRD and SEM, the remainder was redispersed to form a colloidal solution, stable over several days, with a solids content of 6.4%. The XRD of the product shows it to be chabasite, with a uniform particle size 100×400 nm.

EXAMPLE 3

This example illustrates the manufacture of SAPO-34 of small particle size and uniform size distribution.

A synthesis mixture was prepared from the following components in the proportions shown.

| Solution | Component | Proportion |
|---|---|---|
| A | Al$_2$O$_3$ (Pural SB Condea 75%) | 68.18 |
| | H$_2$O | 100.02 |
| B | H$_3$PO$_4$ (Acros, 85%) | 115.52 |
| | H$_2$O, | 80.27 |
| C | Colloidal Silica (Ludox AS40) | 22.73 |
| | H$_2$O, rinse | 10.20 |
| D | TEAOH (Eastern Chemical, 40%) | 182.85 |
| E | DPA (Fluka) | 80.23 |
| F | Seeds, 4.6 Wt. % LEV | 31.95 |

Slurry A was prepared in a mixer, and Solution B added, when a viscous solution resulted. After leaving the solution to rest for 2 minutes, 26.84 parts of rinse water were added. After mixing the paste for 6 minutes, C was added, and mixed for 2 minutes before adding Solution D. Upon adding E with 70.72 parts of rinse water two phases were formed. After a further 3 minutes mixing a visually homogeneous solution resulted and after a further 10 minutes mixing the seeds F were added. The molar composition was:

Al$_2$O$_3$:P$_2$O$_5$:0.3 SiO$_2$:TEAOH:1.6 DPA:56 H$_2$O.+1860 ppm by weight LEV seeds.

The seeded gel was heated for 60 hours at 175° C. in a stainless steel autoclave. The solid product was recovered by centrifugation, washed 11 times with water to a conductivity of about 18 μm, and dried at 120° C. XRD and SEM showed a pure SAPO-34 product with crystals between 0.2 and 1.3 μm, with a few crystals between 2 and 3 μm. Chemical analysis indicated a product of molar composition:

Al$_2$O$_3$:0.99P$_2$O$_5$:0.36 SiO$_2$.

In a similar manner a synthesis mixture was prepared from the following components in the proportions shown.

| Solution | Component | Proportion |
|---|---|---|
| A | Al$_2$O$_3$ (Pural SB Condea 75%) | 68.06 |
| | H$_2$O | 100.15 |
| B | H$_3$PO$_4$ (Acros, 85%) | 115.74 |
| | H$_2$O, including rinse | 104.92 |
| C | Colloidal Silica (Ludox AS40) | 22.50 |
| | H$_2$O, rinse | 10.20 |
| D | TEAOH (Eastern Chemical, 40%) | 183.31 |
| | H$_2$O, rinse | 43.17 |
| E | DPA (Fluka) | 80.79 |
| | H$_2$O, rinse | 26.27 |

Slurry A was prepared in a mixer, and Solution B added, when a viscous mixture resulted. After mixing for 6 minutes, Solution C was added, and mixed for 2 minutes before adding Solution D which was mixed in for 5 minutes. When E was added, two phases were formed. After a further 15 minutes mixing a visually homogeneous mixture resulted. The molar composition was:

Al$_2$O$_3$:P$_2$O$_5$:0.3 SiO$_2$:TEAOH:1.6 DPA:52 H$_2$O.

The synthesis solution was divided, and to one sample a 6.4% slurry of CHA zeolite, prepared as described in Example 2, was added to give a seeding level 410 ppm, the other sample remaining unseeded.

The unseeded sample was heated in a stainless steel autoclave at 175° C. for 60 hours. The seeded sample was divided, one part being heated, without stirring, in a ptfe-lined autoclave for 60 hours at 175° C., and the other being heated with tumbling in a stainless steel autoclave for 60 hours at 175° C.

The samples were allowed to cool, and the product recovered by washing and drying at 120° C. In all cases, a pure SAPO-34 product was obtained, with a molar chemical constitution and crystal sizes as follows:

| Unseeded: | $Al_2O_3$: 0.91 $P_2O_5$: 0.33 $SiO_2$, 1 to 10 μm |
|---|---|
| Seeded, static: | $Al_2O_3$: 0.89 $P_2O_5$: 0.31 $SiO_2$, 0.2 to 1.5 μm |
| Seeded, tumbled: | $Al_2O_3$: 0.91 $P_2O_5$: 0.35 $SiO_2$, ~0.5 μm. |

The benefits of reduced crystal size and size distribution of seeding with colloidal chabasite seeds are apparent, especially when combined with tumbling.

EXAMPLE 4

This example illustrates the use of colloidal Offretite seeds in the manufacture of SAPO-34. The colloidal Offretite was prepared as described in Example 2 of WO 97/03020. A synthesis mixture was prepared as described in Example 3, with the following molar composition:

$Al_2O_3$:$P_2O_5$:0.3 $SiO_2$:TEAOH:1.6 DPA:51 $H_2O$.

To this was added a portion of a 5.36% solids content colloidal offretite slurry (crystal size below 100 nm) to give a seeding level of 203 ppm. Hydrothermal treatment and product recovery were carried out as described in Example 3. The product obtained was pure SAPO-34, the particle size of crystals being mainly between 0.2 and 1.3 μm, with a few crystals between 2 and 3 μm present.

COMPARATIVE EXAMPLE A

This example illustrates the use of powdered LEV, contaminated with some Offretite, in SAPO-34 manufacture. To the same synthesis mixture prepared for use in Example 4 were added a LEV powder in a proportion to give a seed level of 217 ppm. The powder was mixed into the synthesis mixture gel by shaking the gel in a polypropylene bottle for 2 minutes. Hydrothermal treatment and product recovery were carried out as described in Example 4. The product was pure SAPO-34, with the majority of the crystals of size between 0.5 and 2.5 μm. Comparison of this example with Example 4 shows that colloidal seeds at approximately the same weight ratio yield smaller crystals.

EXAMPLE 5

In this example, the effect of seeding on Ni-SAPO 34 manufacture was examined. The synthesis mixture was prepared as in Example 3, except that sufficient nickel nitrate ($Ni(NO_3)_2 6H_2O$, Fluka) was added to Solution A to give a synthesis mixture of molar composition:

$Al_2O_3$:$P_2O_5$:0.3 $SiO_2$:0.0075 NiO:TEAOH:1.6 DPA:50 $H_2O$.

The mixture was divided into two parts, one being seeded with CHA slurry, 6.4% solids content, to a seeding level of 409 ppm. The seeded and unseeded samples were each heated in a stainless steel autoclave for 60 hours at 175° C. After cooling, the products were recovered, washed, and dried at 120° C. In both cases, a pure SAPO-34 phase was recovered, with molar chemical constitutions and crystal sizes as follows:

| Unseeded: | $Al_2O_3$: 0.88 $P_2O_5$: 0.36 $SiO_2$: 0.0040 NiO, 1 to 10 μm |
|---|---|
| Seeded: | $Al_2O_3$: 0.84 $P_2O_5$: 0.31 $SiO_2$: 0.0042 NiO, 0.2 to 1.5 μm. |

Again, the benefit of seeding in producing smaller crystals is apparent.

The two samples made as described above were examined by diffuse reflectance FTIR to establish their crystal quality and Broensted acidity. The IR spectra were obtained in a conventional high temperature DRIFT cell using KBr diluted samples (about 4% sample in dry KBr), the samples being dehydrated before testing at 200 to 300° C. under vacuum. The spectra, obtained using 64 scans at 4 cm$^{-1}$ resolution, were analysed using Gaussian-Lorentzian peaks to determine locations and relative areas and shapes.

The spectra of the seeded and unseeded products of the example were inspected in the region between wave numbers 1400 and 1000 cm$^{-1}$ and the main peaks attributable to framework T-O stretching were measured. In the Table below are set out the centre locations, peak heights and peak widths (C, H, W) of the three main bands in the region.

|  | C, H, W | C, H, W | C, H, W |
|---|---|---|---|
| Seeded | 1106/8.7/51 | 1135/12.3/54.7 | 1179/6.7/65.5 |
| Unseeded | 1082/1.4/90 | 1129/2.1/71 | 1190/0.9/90.6 |

The seeded sample has, as is apparent from the Table, by far the highest and sharpest peaks, and hence the highest internal crystallinity.

The sole figure of the accompanying drawings shows the region between wave numbers 3800 and 3450 cm$^{-1}$.

Referring now to the figure, the locations, heights and widths of the main peaks attributable to the bridged hydroxyl groups are shown for the samples. The band at ≈3620 is attributed to undisturbed Broensted OH groups in 8-membered rings while that at ≈3595 is attributed to such OH groups interacting with framework oxygen or OH groups located in the 6-membered rings. Measurement of the contribution (by area) of these bands to the total area in the OH region gives the results in the Table below:

| Sample | % Area Contribution |
|---|---|
| Seeded | 62 |
| Unseeded | 21 |

Clearly, the seeded sample has the higher percentage area contribution from the Broensted acid sites, despite the fact that this sample has a lower particle size, and hence a larger surface/volume ratio. From this it is tentatively concluded that the remaining peaks in the 3800 to 3620 cm$^{-1}$ range are associated with internal defects rather than surface hydroxyl groups, and postulated that products with high percentage area contribution of Broensted acid OH groups to the total OH area are materials with a high level of internal crystal perfection.

EXAMPLE 6

This example illustrates the use of CHA seeds in the manufacture of SAPO-34 with a silicon content different from that of Example 3. The synthesis solution was prepared as described in Example 3, but with components in proportions to give the following molar composition:

$Al_2O_3$:$P_2O_5$:0.1 $SiO_2$:TEAOH:1.6 DPA:52 $H_2O$.

A slurry of 6.4% solids content of CHA seeds was added to give a seed content of 397 ppm.

The mixture was hydrothermally treated as described in Example 3, and the product recovered in the same way. It was pure SAPO-34, with most crystals in the range 0.2 to 1.5 µm, with a few crystals of size in the 2 to 4 µm range also present. The product analysed as $Al_2O_3:0.79\ P_2O_5:0.21\ SiO_2$.

EXAMPLE 7

Example 6 was repeated, except that the silica content was varied to give a molar composition of the synthesis mixture of:

$Al_2O_3:P_2O_5:0.45\ SiO_2:TEAOH:1.6\ DPA:52\ H_2O$ with 397 ppm CHA seeds.

The hydrothermal treatment was as described in Example 3; the product was pure SAPO-34 of particle size between 0.2 and 1.5 µm. Chemical analysis:

$Al_2O_3:0.92\ P_2O_5:0.42\ SiO_2$.

The yields from Examples 6 and 7, and the static seeded part of the second part of Example 3, the synthesis mixtures of which differed primarily in their silicon contents, were as follows:

Example 6, 0.1 $SiO_2$; yield 7.8% 3, 0.3 $SiO_2$; yield 12.5% 7, 0.45 $SiO_2$; yield 12.7%.

COMPARATIVE EXAMPLE B

In Examples 5 to 7, hydrothermal treatment was carried out in a static autoclave. In this and following examples, the influences of stirring and tumbling on the properties of SAPO-34 were examined, this example employing an unseeded synthesis mixture of a molar composition similar to that of the second part of Example 3, but with 51 moles of $H_2O$ rather than 52. Hydrothermal treatment was carried out by heating the synthesis mixture in a stainless steel autoclave from room temperature to 175° C. over 6 hours, with stirring at 120 rpm, and maintained at 175° C. for 60 hours with continued stirring. Recovery was as described in Example 3. The product was a mixture of SAPO-34, SAPO-18, with some SAPO-5, the crystals being within the range of 0.2 to 1 µm.

EXAMPLE 8

This example illustrates the effect of stirring an Offretite seeded synthesis mixture during hydrothermal treatment. Colloidal (<100 nm) Offretite seeds were added from a 5.36% solids content Offretite slurry, the resulting molar composition of the seeded mixture being:

$Al_2O_3:P_2O_5:0.3\ SiO_2:TEAOH:1.6\ DPA:54H_2O$ plus 0.19 weight % seeds.

The synthesis mixture was divided into two parts. One part (A) was placed in a stainless steel autoclave equipped with a 120 rpm stirrer and heated from room temperature to 175° C. over 6 hours with stirring, and maintained at 175° C. for 60 hours with continued stirring. A second part (B) was heated without stirring from room temperature to 175° C. over 2 hours, and maintained at 175° C. for 48 hours, with a sample (C) being taken at 24 hours. After recovery and drying, the products were analysed by SEM and XRD.

Sample A: SAPO-34, contaminated with SAPO-18 and some SAPO-5, crystals between 0.2 and 1.0 µm.

Sample B: Pure SAPO-34, with crystal size 0.5 to 2 µm.

Sample C: SAPO-34 with some amorphous material, crystals between 0.2 and 1.5 µm.

EXAMPLE 9

This example illustrates the effect on Ni-SAPO-34 manufacture of agitation during the warm-up period of hydrothermal treatment, followed by static heat-soaking. A nickel-containing synthesis mixture was prepared, following the procedure described in Example 4, to produce a mixture of molar composition:

$Al_2O_3:P_2O_5:0.3\ SiO_2:0.0076\ NiO:TEAOH:1.6\ DPA: 52H_2O$.

The mixture was divided into two parts, of which one, sample A, was seeded with the CHA seeding slurry used in Example 5 to give a seed content of 202 ppm, the other, sample B, remaining unseeded. Both samples were transferred to stainless steel autoclaves, which were placed in an oven and mounted on a horizontal shaft rotatable at 60 rpm. The autoclaves were tumbled for a 2 hour period of heating to 175° C.; tumbling then ceased and the temperature kept at 175° C. for 60 hours.

After cooling, the products were recovered by centrifugation, washed, and dried at 120° C. XRD showed that both products were pure Ni-SAPO-34. Sample A comprised crystals of particle size about 1 µm, with damaged surfaces. Sample B comprised crystals of size ranging up to 10 µm, many crystals being fragmented.

The example shows that seeding is required to bring the particle size down to the desired levels even with initial tumbling.

EXAMPLE 10

This example illustrates the use of a SAPO-34 seed slurry in SAPO-34 manufacture.

To a synthesis mixture of the molar composition set out in the second part of Example 3 was added a 10% slurry of SAPO-34, prepared as described in the second part of Example 3 with tumbling, to give a seeding level of 0.1% (1000 ppm). The seeded mixture was heated in a stainless steel autoclave at 175° C. for 48 hours. The mixture was allowed to cool, and the product recovered and identified as pure SAPO-34 with crystal sizes ranging from 0.5 to 4 µm. The example illustrates that while colloidal SAPO-34 crystals are effective in SAPO-34 manufacture they are not as effective as CHA or LEV structure type zeolite seeds.

EXAMPLE 11

In this example the effectiveness in catalysing the methanol to olefin conversion of the products made and discussed in Example 5 was measured. In a bench scale fixed bed reactor maintained at 450° C. methanol diluted with nitrogen (total pressure-atmospheric, partial pressure of methanol 0.12) was passed over a catalyst at WHSV (based on methanol) of 1 $hr^{-1}$ and a GHSV (based on methanol plus nitrogen) of about 5500 $hr^{-1}$. After 1 hour on stream at 100% methanol conversion, the results were as shown in the Table.

| Yield, % | Seeded | Unseeded |
|---|---|---|
| $C_2=$ | 50.1 | 47.9 |
| $C_3=$ | 28.0 | 33.4 |
| $C_2= +C_3= +C_4=$ | 85.6 | 91.4 |
| $C_1$ to $C_4$ sats. | 11.0 | 6.1 |

The yield of the more desirable ethylene is increased by about 5% using the product obtained with seeding compared with the unseeded product.

We claim:

1. A process for the manufacture of a crystalline molecular sieve containing phosphorus in its framework, which process comprises treating a synthesis mixture comprising a source of aluminum, a source of phosphorus, an organic template, and colloidal crystalline molecular sieve seeds for a time and at a temperature sufficient to form the crystalline molecular sieve, wherein the phosphorus-containing molecular sieve is selected from the group consisting of aluminophosphates and silica-aluminophosphates.

2. A process as claimed in claim 1, wherein the phosphorus-containing molecular sieve is of the CHA or LEV structure type.

3. A process as claimed in claim 1, wherein the phosphorus-containing molecular sieve is SAPO-34.

4. A process as claimed in claim 3, wherein the SAPO34 is Ni-SAPO-34.

5. A process as claimed in claim 3, wherein the percentage area contribution of Broensted acid sites to the total OH area in the IR specs is at least 30%.

6. A process 5 as claimed in claim 5, wherein said contribution is at least 50%.

7. A process as claimed in claim 1, wherein the seeds are of structure type LEV, OFF, or CHA.

8. A process as claimed in claim 1, wherein the seeds are of Levyne, ZSM-45, Chabasite, Offretite, or SAPO-34.

9. A process as claimed in claim 1, wherein the seeds are present in a proportion within the range of 1 to 2000 ppm, based on the total weight of the synthesis mixture.

10. A process as claimed in claim 9, wherein the proportion is within the range of from 100 to 1500 ppm.

11. A process as claimed in claim 9, wherein the proportion is within the range of from 100 to 250 ppm.

12. A process as claimed in claim 1, wherein the seeds are incorporated in the synthesis mixture in the form of a suspension.

13. A process as claimed in claim 1, wherein the particle size of the seeds is within the range of from 5 to 1000 nm.

14. A process as claimed in claim 13, wherein the particle size is within the range of from 10 to 300 nm.

15. A process as claimed in claim 13, wherein the particle size is within the range of from 20 to 100 nm.

16. A process as claimed in claim 1, wherein the phosphorus-containing molecular sieve is of a first structure type and the seeds are of a second structure type.

17. A process as claimed in claim 16, wherein the first structure type is CHA and the second structure type is LEV.

18. The molecular sieve product of the process as claimed in claim 1 wherein, within said molecular sieve product, the percentage area contribution of Broensted acid sites to the total OH area in the IR spectrum is at least 30%.

19. The molecular sieve of claim 18, in particulate or layer form.

20. SAPO-34 in which the percentage area contribution of Broensted acid sites to the total OH area in the IR spectrum is at least 30%.

21. A process for the conversion of an oxygenate to olefins which comprises contacting the oxygenate under catalytic conversion conditions with the molecular sieve of claim 18.

22. A process for the conversion, adsorption or separation of hydrocarbons which comprises contacting the hydrocarbons with the molecular sieve of claim 18, optionally after washing, cation exchange, or calcining.

23. A process for the synthesis of a phosphorus-containing crystalline molecular sieve which comprises treating a synthesis mixture with colloidal crystalline molecular sieve seed crystals to control the particle size of the phosphorus-containing molecular sieve and/or the acceleration of the formation of the phosphorus-containing crystalline molecular sieve during synthesis, wherein the phosphorus-containing molecular sieve is selected from the group consisting of aluminophosphates and silica-aluminophosphates.

* * * * *